Feb. 24, 1970  J. D. PETERSON ET AL  3,496,987

METHOD OF FORMING THREE-DIMENSIONAL REFRACTORY SHAPES

Filed June 29, 1967

INVENTOR.
J. DAVID PETERSON
GERALD A. JENSEN
BY Charles M Hogan
Abraham Ogman
ATTORNEYS 3,496,987
METHOD OF FORMING THREE-DIMENSIONAL REFRACTORY SHAPES
John D. Peterson, North Grafton, Mass., and Gerald A. Jensen, Dayton, Ohio, assignors to Avco Corporation, Cincinnati, Ohio, a corporation of Delaware
Filed June 29, 1967, Ser. No. 650,080
Int. Cl. B23p 17/00, 25/00
U.S. Cl. 164—19                 9 Claims

ABSTRACT OF THE DISCLOSURE

This invention relates to a process using metallizing and plasma arc spraying procedures to produce three-dimensional refractory shapes including three-dimensional electric discharge machining (EDM) electrodes both of which exhibit exceptional surface finish and a remarkable degree of detail reproduction. A series of steps comprising the alternate use of models and molds are used to bridge the gap between a master model or mold and the finished product.

BACKGROUND OF THE INVENTION

The invention relates generally to processes for reproducing three-dimensional shapes in refractory materials from master models using metal spraying techniques. The processes are peculiarly adapted to forming three-dimensional composite EDM electrodes of the type described in Patent Numbers 3,244,852 and 3,303,559.

Traditionally, three-dimensional refractory shapes have been formed by pressing and sintering a rough block which is then laboriously machined into the desired three-dimensional configuration. The cost in time and expense is very high for the very properties that make refractory materials useful for EDM electrodes or as wear-resistant devices make such materials extremely difficult to machine.

More recently, three-dimensional refractory shapes have been sprayed. In these cases, however, no attempt has been made and no suggestions have been offered for producing three-dimensional shapes having surface finishes which do not require further machining. These sprayed refractory shapes are first formed into a rough form in the approximate shape of the desired configuration. The rough form is then laboriously machined. It is economically impractical, if not technically impractical, to machine three-dimensional refractory shapes having very complex surface contours such as, for example, would be found in artistic work.

A particularly vexing problem associated with spraying refractory shapes requiring no machining is providing excellent surface finishes and detail reproduction. The solution appears to lie to a considerable extent in the choice of a suitable substrate material and/or the preparation of the substrate to receive a coating.

It is not possible to spray refractory materials with metallizing equipment. Refractory deposits are constructed using electric arc plasma coating equipment. The intense heat of the plasma tends to alter the shape of the model substrate. The heat of the plasma also tends to pit or deform the surface of most substrate materials. Additionally, many materials that exhibit dimensional stability under high heat have been known to resist all efforts to cleanly part a metallized or plasma deposited coating from its surface.

It is therefore an object of the invention to provide processes for making three-dimensional shapes which avoid the limitations and disadvantages of prior art processes.

It is another object of the invention to provide a process for making three-dimensional shapes from refractory materials utilizing models formed from low temperature materials.

It is another object of the invention to provide a process for making three-dimensional EDM electrodes in a simple and facile manner.

It is yet another object of the invention to provide a process for making three-dimensional EDM electrodes that includes a novel technique for assuring the removal of the electrode from a model without material detriment to the model and without sacrificing detail reproducibility.

It is yet another object of the invention to provide a spray deposition process for making a three-dimensional EDM electrode where the electrode exhibits exceptional surface finish and a remarkable degree of detail reproduction.

Another object of the invention is to define a process for making three-dimensional refractory shapes having undercuts or negative drafts.

Another object of the invention is to reproduce multiple refractory shapes from a single master model without making a new master each time.

In accordance with the invention, a model, preferably a porous model, of the three-dimensional shape that is to be reproduced is formed. The porous model is then saturated with a non-flammable liquid such as water. A non-refractory metal coating is then deposited on the saturated model and parted therefrom to form a working mold.

To form an EDM electrode, the metal mold is coated with a refractory material using spray coating procedures. The refractory material deposited in the metal mold comprises a porous refractory skeleton of the master model.

The electrode is completed by first reducing refractory oxides that may have formed during deposition of the refractory coating in the metal mold and then raising the temperature of the coated metal mold above the melting point of the metal mold material. On melting, the mold material impregnates the porous refractory skeleton to form a composite refractory shape well suited for use as an EDM electrode.

In the alternative, should a porous refractory shape be desired, it is merely necessary to part the porous refractory skeleton from the metal mold by any suitable practice, i.e., etching, parting agents, differential temperature contraction, etc.

DESCRIPTION OF PREFERRED EMBODIMENT

The novel features that are considered characteristic of the invention are set forth in the appended claims; the invention itself, however, both as to its organization and method of operation, together with additional objects and advantages thereof, will best be understood from the following description of a specific embodiment and an examination of the figures.

Figure 1:
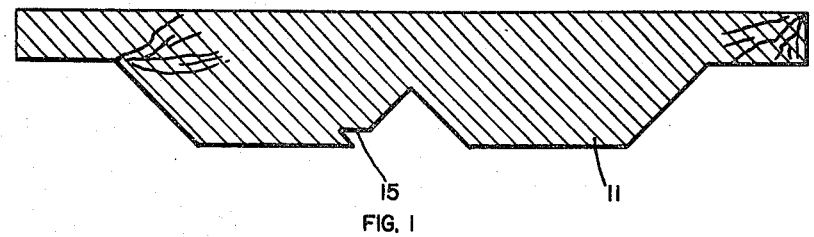
FIGURE 1 is a cross sectional representation of a master model.
Figure 2:
FIGURE 2 is a cross sectional representation of an elastomeric mold made from and conforming to the master model of FIGURE 1.
Figure 3:
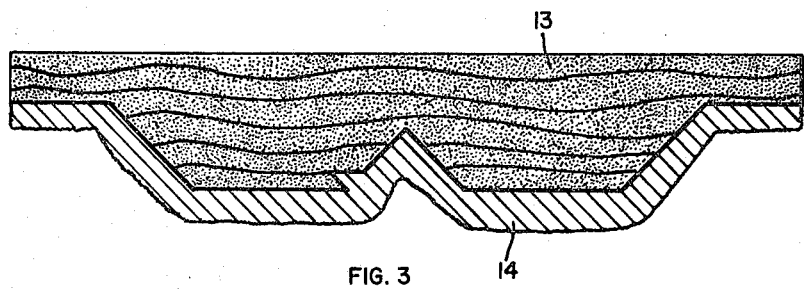
FIGURE 3 is a cross sectional representation of a porous model, formed from and conforming to the elastomeric mold, and having a coating of non-refractory material.
Figure 4:
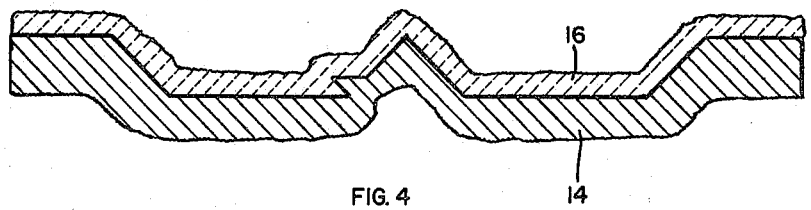
FIGURE 4 is a cross sectional representation of the FIGURE 3 non-refractory coating used as a mold and containing a refractory coating.

Metallizing and plasma spraying techniques have long shown promise in forming three-dimensional refractory shapes to be used as EDM electrodes in electric discharge machining or for other purposes. With regard to the EDM electrodes, porous tungsten skeletons formed into a desired shape and impregnated with copper, silver, intermetallics, etc., have been recognized to be highly desirable EDM electrode materials. These composites, by virtue of their high wear ratio and resistance to edge-wear, perform better and wear longer than electrodes made only of one material.

The process of spray forming a copper-tungsten electrode, for example, as shown below, has considerable value in that it avoids the limitations previously present in fabricating electrodes of this type; it has made three-dimensional refractory shapes and electrodes commercially valuable.

The basic steps involved in producing a sprayed three-dimensional refractory electrode comprises forming a model out of a porous material that is dimensionally stable in the presence of high heat. Examples of such materials are plaster of Paris, sand and fused silica.

After the porous model is formed, it is ready to take a deposit. In the case of plaster of Paris, the model is saturated in a non-flammable material such as water. This is necessary to obtain a fine surface finish and exacting detail. Since the surface temperature of the porous model is raised with each layer of material deposited, in the absence of a fluid surface, damage and loss of detail occurs and it is difficult or impossible to part the working mold from the porous model without embedding pieces of the porous model in the surface of the working mold. Furthermore, plaster easily deteriorates and breaks up, if dry. Yet when saturated, it is an excellent low-cost material for the porous model.

Where the porous mode is particulate and heat resistant, a sand or fused silica model for example, it can be separated—broken away—from the coating applied to it without too much difficulty, even though dry. Saturating such a model does facilitate such separation, however.

The saturated porous model is then coated with copper, silver, or an intermetallic or other non-refractory material to form a working mold. The working mold is best formed by metallization. The working mold is formed by coating the porous model with successive layers of material. A buildup of $\frac{1}{16}$ inch to $\frac{1}{8}$ inch provides very adequate structural integrity.

After the coating is complete the working mold is removed from the porous model. The working mold is then sprayed and coated with the refractory material, tungsten being preferred.

Following the application of the refractory coating, oxides are reduced by heating in a reducing atmosphere, followed by heating to a temperature sufficient to melt the working mold, which becomes an impregnant that saturates the refractory shape by means of capillary action to form the electrode. A more detailed and preferable process is described in Example 1.

In an alternative process, where one does not want to impregnate the refractory shape, the working mold is heated to a temperature of several hundred degrees before the refractory deposit is applied. Both the working mold and the refractory deposit are then cooled. They will part as they cool due to the differences in thermal contraction rates. The refractory skeleton can also be parted from the metal mold through the use of parting agents, etching, and oxide layers.

Note that in either case, the metal mold is eliminated; it is separated from or infiltrated into the refractory skeleton.

Example No. 1: Refer to FIGURES 1–5

(a) Obtain a wood, plaster, plastic, clay or metal master model 11 of the shape to be produced. Cast a mold 12 of this master using low cost, fast curing elastomeric molding materials such as polysulphide or silicone rubber. After curing, remove the master model 11 from from the rubber mold 12. The elastic properties of the mold 12 is essential where the master model 11 contains an undercut or negative draft as at 15. Make porous model 13 in the form of a plaster of Paris (gypsum) casting in the rubber mold. Cure the plaster casting for 12 to 18 hours at room temperature or 2 to 3 hours at 300 to 400° F. Immediately before spraying, immerse the plaster casting in clear, cool water for a period of about 20 minutes until there are no bubbles observed rising from the casting. Set up the plaster casting in a manner to facilitate application of the spray coating.

(b) Spray coat the entire surface of the plaster casting with copper, silver or intermetallic, using conventional oxy-gas metallizing equipment to form a metal mold 14. Build up the metal, copper in this example, to a sound structural thickness (usually $\frac{1}{16}$ to $\frac{1}{8}$ inch). Remove the plaster from the copper mold 14 by brushing the exposed interface in hot water with a stiff bristle brush to remove plaster traces that may be on the surface. The use of the impregnated porous model will prevent the working mold from carrying large pieces of plaster.

(c) Place the copper mold 14 on a sponge partially immersed in a pan of water located in the plasma spray area. Plasma spray the exposed interface with a refractory metal, tungsten for example, continuing to build up the entire surface until a thickness of approximately $\frac{1}{8}$ inch is obtained, thereby forming a porous refractory shape 16.

Figure 5:
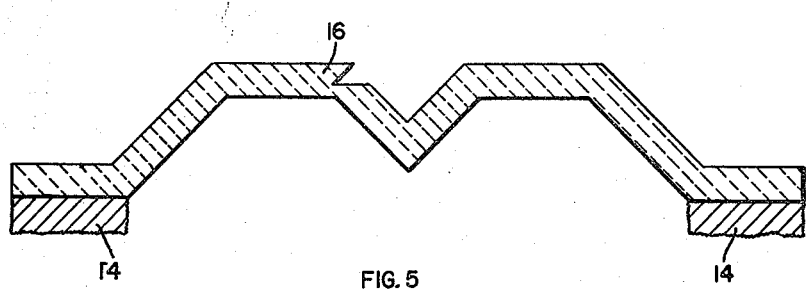
FIGURE 5 is a cross sectional representation of the FIGURE 4 refractory coating with the non-refractory mold material impregnated therein.

(d) Remove the coated copper mold (FIGURE 4) from the sponge and place it in a furnace or retort having a reducing atmosphere. Maintain the temperature in the furnace at 1832° F. for a period of time (1 hr./250 in. of thickness) until all entrapped oxides are removed. Turn the coated copper mold over so that the proposed finished surface of the refractory shape is up (FIGURE 5). Raise the temperature above the melting point of the copper, to 2192° F. for example, and again hold for a similar period of time to permit complete infiltration of the copper into the tungsten shape.

(e) Cool to room temperature while maintaining the reducing atmosphere. Remove the completed electrodes from the furnace, remove any excess copper 14', from unfinished surfaces, attach mounting shanks, drill oil holes and proceed to use as an EDM electrode.

Example No. 2

(a) Obtain a wood, plaster, plastic, clay or metal master model 11 of the shape to be produced. Cast a mold 12 of this master model 11 using low cost, fast curing elastomeric molding materials such as polysulphide or silicone rubber. After curing, remove the master model 11 from the rubber mold 12. Make porous model 13 in the form of a plaster of Paris (gypsum) casting in the rubber mold. Cure the plaster casting for 12 to 18 hours at room temperature or 2 to 3 hours at 300 to 400° F. Immediately before spraying, immerse the plaster casting in clear, cool water for a period of about 20 minutes until there are no bubbles observed rising from the casting. Set up the plaster casting in a manner to facilitate application of the spray coating.

(b) Spray coat the entire surface of the plaster casting with copper, silver or intermetallic, using conventional oxy-gas metallizing or plasma spray equipment to form a metal mold 14. Build up the metal, copper in this example, to a sound structural thickness (usually $\frac{1}{16}$ to $\frac{1}{8}$ inch). Remove the plaster from the copper mold 14 by brushing the exposed interface in hot water with a stiff bristle brush to remove the plaster traces that may be on the surface. The use of the impregnated porous model will prevent the working mold from carrying large pieces of plaster.

(c) Apply a salt solution to the parting surface of the copper mold 12 and evaporate the solvent. Spray coat the copper mold with a refractory metal as in Example 1. Place the coated copper mold in a salt solvent to dissolve the salt at the parting surface this causing the refractory shape 16 to separate from the copper mold 14.

Several very significant observations can be made. The alternate use of models and molds preserves the desired surface configuration in excellent finish and exacting detail to the final refractory member.

The use of a flexible mold (FIGURE 2) in conjunction with disposable porous models makes it possible to fabricate electrodes having undercuts or negative drafts.

In the absence of undercuts the master may be manufactured as an inverse mold to begin with thus eliminating one step.

Having a master, the novel process uses simple and inexpensive manufacturing techniques to accomplish an otherwise very expensive, and difficult manufacturing job.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:
1. A process for forming three-dimensional refractory shapes comprising the steps of:
   (a) forming a model of the shape to be produced;
   (b) forming an elastomeric negative mold of said shape;
   (c) casting a working model of said shape in the elastomeric mold;
   (d) removing the working model from the elastomeric mold and coating it with a non-refractory material to form a working mold of said shape;
   (e) coating the surface of the working mold formed in said shape with a refractory material; and
   (f) eliminating the working model leaving a refractory shape.
2. A process for forming three-dimensional refractory shapes comprising the steps of:
   (a) forming a model of the shape to be produced;
   (b) forming an elastomeric negative mold of said shape;
   (c) casting a working model of said shape in the elastomeric mold;
   (d) removing the working model from the elastomeric mold and coating it with a non-refractory metal to form a working mold of said shape;
   (e) coating the surface of the working mold formed in said shape with a refractory material; and
   (f) separating the working model from the refractory coating leaving a refractory shape.
3. A process for forming three-dimensional refractory shapes comprising the steps of:
   (a) forming a model of the shape to be produced;
   (b) forming an elastomeric negative mold of said shape;
   (c) casting a porous working model of said shape in the elastomeric mold and saturating it with an non-flammable fluid;
   (d) removing the working model from the elastomeric mold and spray coating it with a non-refractory metal to form a working mold of said shape;
   (e) coating the surface of the working mold formed in said shape; and
   (f) melting the working model causing the non-refractory metal to infiltrate the refractory coating leaving a refractory shape.
4. A method of forming a three-dimensional refractory shape comprising the steps of:
   (a) forming a porous model of the shape that is to be reproduced;
   (b) saturating said porous model with a non-flammable liquid;
   (c) coating the saturated model with a non-refractory metal to form a working mold having a surface in the shape that is to be reproduced;
   (d) coating the surface of the working mold having the shape that is to be reproduced with a refractory material; and
   (e) eliminating the working mold leaving a refractory shape.
5. A process as defined in claim 4 wherein the working mold and the refractory coating are formed by spray deposition.
6. A process as defined in claim 4 wherein the non-flammable liquid is water.
7. A process as defined in claim 4 wherein the porous model is formed from a class of materials consisting of sand, fused silica and plaster of Paris.
8. A process as defined in claim 4 wherein the coated working mold is melted and infiltrates the refractory coating.
9. A method as defined in claim 4 in which the working mold is parted from the refractory coating leaving a purely refractory three-dimensional shape.

References Cited

UNITED STATES PATENTS

| | | | |
|---|---|---|---|
| 3,206,810 | 9/1965 | Hockin et al. | 164—34 |
| 3,322,185 | 5/1967 | Christenson | 219—69 |
| 3,334,212 | 8/1967 | Kirschenbaum | 219—69 |
| 3,367,023 | 2/1968 | Petermann | 29—527 |
| 3,393,726 | 7/1968 | Schott | 164—34 X |
| 3,426,421 | 2/1969 | Leedy et al. | 29—529 |

PAUL M. COHEN, Primary Examiner

U.S. Cl. X.R.

29—424, 527.3; 164—8; 219—69